United States Patent

[11] 3,608,926

| [72] | Inventor | Lynn H. Sprunger |
| | | P.O. Box 78, Albion, Ind. 46701 |
| [21] | Appl. No. | 815,812 |
| [22] | Filed | Apr. 14, 1969 |
| [45] | Patented | Sept. 28, 1971 |

[54] SUSPENSION SYSTEM FOR AN AXLED VEHICLE
4 Claims, 3 Drawing Figs.

[52] U.S. Cl.................................................. 280/124,
267/63
[51] Int. Cl..................................................... B60q 11/22
[50] Field of Search............................................ 280/106.5,
124; 267/63

[56] References Cited
UNITED STATES PATENTS
2,782,026  2/1957  Hirst............................. 280/124 X
2,995,383  8/1961  Barker.......................... 267/63 X Primary Examiner—Philip Goodman
Attorney—Oltsch & Knoblock ABSTRACT: A suspension system for a vehicle having a frame which includes a pair of spaced longitudinal frame members. An upper bracket is secured to each frame member and has diverging downwardly extending end parts which project below the supporting frame member and which are positioned longitudinally of the vehicle. A lower bracket is spaced below each upper bracket and includes diverging downwardly extending end parts which are separated by an intermediate part and which underlie corresponding end parts of the adjacent upper bracket. Resilient means is disposed between and interconnects each pair of corresponding upper and lower bracket end parts. An axle extends transversely of the frame between the end parts of each lower bracket and is secured to the intermediate part thereof.

PATENTED SEP 28 1971

3,608,926

INVENTOR.
LYNN H. SPRUNGER

BY *Oltsch & Knoblock*

ATTORNEYS

SUSPENSION SYSTEM FOR AN AXLED VEHICLE

SUMMARY OF THE INVENTION

This invention relates to a suspension system for axled vehicles.

My invention concerns a suspension system for a vehicle having a frame which includes a pair of spaced longitudinal frame members. An upper bracket is secured to each frame member and includes diverging downwardly extending end parts which project below the supporting frame member and which are positioned longitudinally relative to the vehicle. A lower bracket is spaced below each upper bracket and includes diverging downwardly extending end parts which are separated by an intermediate part and which underlie corresponding end parts of the adjacent upper bracket. Resilient means are disposed between and serve to interconnect each pair of corresponding upper and lower bracket end parts. An axle extends transversely of the frame between the end parts of each lower bracket and is secured to the intermediate part thereof. The included angle between the end parts of each upper and lower bracket is preferably between 60° and 120°, so as to subject each interconnecting resilient means to a major compressive force when supporting the vehicle frame.

In prior art suspension devices, such as that disclosed in U.S. Pat. No. 3,301,573, utilizing upper and lower brackets having corresponding depending parts which are interconnected by resilient means, such resilient means are placed predominantly in shear and not predominantly in compression as is the case in my invention. When so placing the interconnecting resilient means in shear, the cross-sectional area of the resilient means must be of sufficient size to prevent its rupture or tearing. In my invention, by placing the resilient means used therein predominantly in compression, such resilient means need not have a cross-sectional area as large as the cross-sectional area of the resilient means utilized in the prior art.

Additionally, in the suspension system of my invention the vehicle axle is positioned close to the vehicle frame, thereby lowering the center of gravity of the vehicle and adding to the stability of the vehicle.

Accordingly, it is an object of this invention to provide a suspension system for a vehicle having an axle which is interconnected to the vehicle frame by means of resilient means placed predominantly in compression when supporting the vehicle load.

It is another object of this invention to provide a suspension system for a vehicle which causes the vehicle to have a low center of gravity and which is simple to manufacture and of economical construction.

Other objects of this invention will become apparent upon a reading of the invention's description.

BRIEF DESCRIPTION OF THE DRAWINGS

A preferred embodiment of this invention has been chosen for the purposes of illustration and description wherein.

DESCRIPTION OF THE PREFERRED EMBODIMENT

The preferred embodiment illustrated is not intended to be exhaustive or to limit my invention to the precise form disclosed. It is chosen and described in order to best explain the principles of the invention and its application and practical use to thereby enable others skilled in the art to best utilize the invention.

For purposes of illustration, the suspension system of my invention is shown connected to the frame 10 of a trailer. Frame 10 includes spaced substantially horizontal longitudinal frame members 12 joined by longitudinally spaced transverse frame members 14. A tongue 16 may be connected to the forwardmost pair of transverse frame members 14 and extend forwardly therefrom. It is to be understood that my invention may also be used with self-propelled vehicles as well as towed vehicles.

Figure 1:
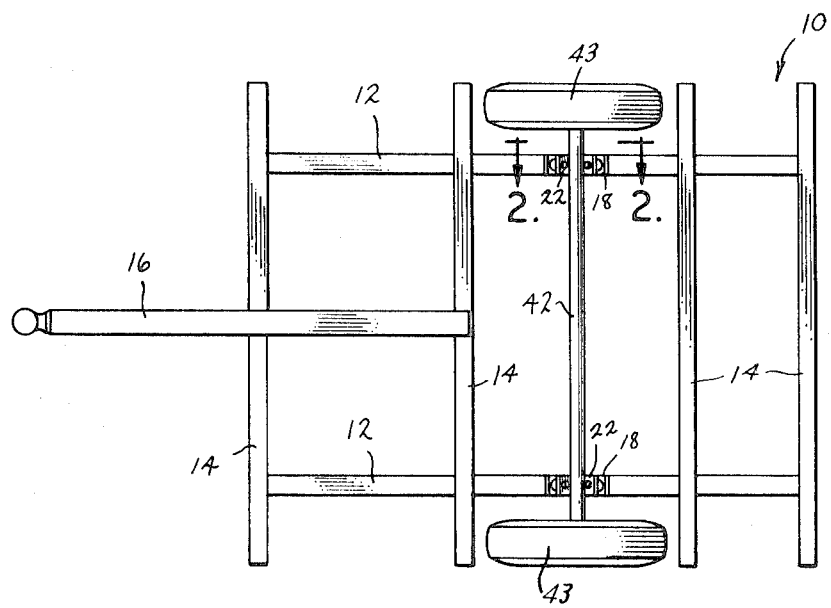
FIG. 1 is a bottom view of a vehicle showing my suspension system interconnecting the axle to the frame of the vehicle.
Figure 2:
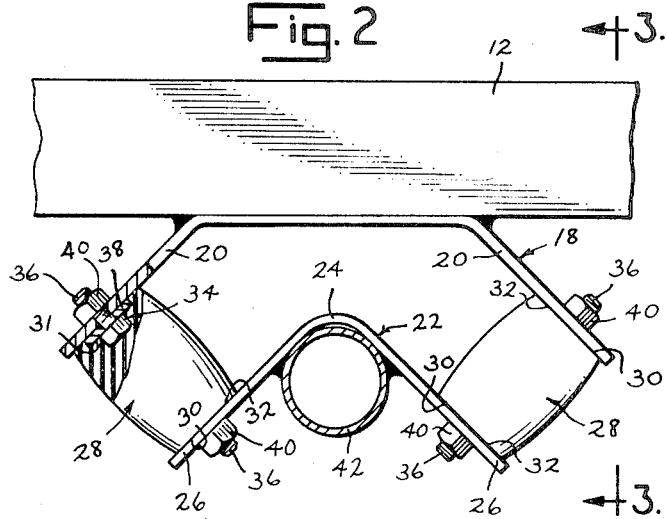
FIG. 2 is a fragmentary side view of the vehicle frame and suspension system as viewed along line 2—2 of FIG. 1 with portions of the suspension system being broken away for purposes of illustration.
Figure 3:
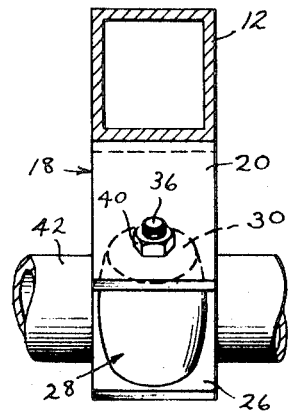
FIG. 3 is a fragmentary end view of the vehicle frame and suspension system as viewed along line 3—3 of FIG. 2.

An upper bracket 18 is secured, such as by welding, to each frame member 12. Each upper bracket 18 is oppositely spaced across frame 10 from the other and includes spaced downwardly extending divergent end parts 20 which extend longitudinally of the frame and which are preferably each equally angularly inclined relative to the supporting frame member 12. A lower bracket 22 is disposed below and is spaced from each upper bracket 18. Each lower bracket 22 includes an intermediate part 24 and depending downwardly extending divergent end parts 26 which extend longitudinally of frame 10 and which are each preferably positioned substantially parallel to a corresponding end part 20 of the overlying upper bracket 18 as shown in FIG. 2.

A resilient member 28 having transverse end faces 30 and preferably of substantially cylindrical shape is disposed between each pair of corresponding bracket end parts 20 and 26 and is connected thereto with each end face 30 preferably abutting a confronting surface 32 of an end part. The angle of inclination of each resilient member 28 relative to the frame member 12 which supports it is preferably approximately 50°- but may be between about 46° and 85°. Each resilient member 28 is preferably of a rubber composition but could be formed from any synthetic resilient material. One means of connecting each resilient member 28 to bracket end parts 20 and 26 may consist of providing each end face 30 of the resilient member with a recess 31 to receive the head of a coaxially positioned bolt 34 having a shank 36 which projects outwardly from face 30. A washer 38 surrounds shank 36 and is seated within recess 31, preferably flush with face 30. Washer 38 is bonded to resilient member 28 and serves to secure bolt 34 to member 28. Each bracket end part 20 and 26 is apertured and receives the shank 36 of a bolt 34. A nut 40 is threaded over the protruding part of each bolt shank 36 and is tightened to draw the adjacent end face 30 of the resilient member into contact with confronting surface 32 of the bracket end part. An axle 42 extends transversely of frame 10. Wheels 43 are carried at the ends of axle 42. Axle 42 is positioned between end parts 26 of each lower bracket 22 and is secured, such as by welding, to the intermediate part 24 thereof.

In operation, vehicle load and road shock are transmitted between axle 42 and frame 10 of the vehicle through resilient members 28 which serve as a cushioning medium. Each resilient member 28 is so inclined relative to frame 10 that it is placed predominantly in compression during use.

What I claim is:

1. A suspension system for a vehicle having a frame which includes a pair of spaced substantially horizontal longitudinal frame members, said suspension system comprising an upper bracket secured to each frame member, each upper bracket having diverging downwardly extending end parts projecting below its supporting frame member and longitudinally of the vehicle, a lower bracket spaced below each upper bracket and including diverging downwardly extending end parts each underlying a corresponding end part of the overlying upper bracket and an intermediate part, a resilient member disposed between and fixedly interconnected to each pair of corresponding upper and lower bracket end parts, said resilient member being inclined relative to the frame member from which it is supported so as to be placed predominantly in compression when supporting the vehicle load, and an axle extending transversely of said frame between the end parts of each lower bracket, said axle being secured to the intermediate part of each lower bracket and carrying wheels each located adjacent an upper bracket and having an outer perimeter extending beyond the extreme edges of the resilient members secured to said adjacent upper bracket.

2. The suspension system of claim 1 wherein each pair of corresponding end parts of said upper and lower brackets is substantially parallel.

3. The suspension system of claim 1 wherein said resilient member is substantially cylindrical in shape and has opposite transverse end faces which engage confronting surfaces of each pair of corresponding end parts of said upper and lower brackets.

4. The suspension system of claim 1 wherein said resilient member is inclined between 46° and 85° relative to the frame member from which it is supported.